(12) United States Patent
Dicorpo et al.

(10) Patent No.: US 7,644,318 B2
(45) Date of Patent: Jan. 5, 2010

(54) METHOD AND SYSTEM FOR A FAILOVER PROCEDURE WITH A STORAGE SYSTEM

(75) Inventors: Jeffrey Dicorpo, San Carlos, CA (US); Stanley S. Feather, Longmont, CO (US); Douglas W. Rauenzahn, Los Osos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 10/984,282

(22) Filed: Nov. 9, 2004

(65) Prior Publication Data

US 2006/0015770 A1    Jan. 19, 2006

Related U.S. Application Data

(60) Provisional application No. 60/587,694, filed on Jul. 14, 2004.

(51) Int. Cl.
*G06F 11/00* (2006.01)
(52) U.S. Cl. .......................................... 714/43; 714/56
(58) Field of Classification Search .................. 714/43, 714/56
See application file for complete search history.

(56) References Cited

U.S. PATENT DOCUMENTS

| | | | |
|---|---|---|---|
| 6,601,195 B1 * | 7/2003 | Chirashnya et al. ............ 714/43 |
| 6,625,747 B1 | 9/2003 | Tawil et al. | |
| 6,681,339 B2 | 1/2004 | McKean et al. | |
| 6,715,031 B2 | 3/2004 | Camble et al. | |
| 6,725,394 B1 | 4/2004 | Bolt | |
| 6,779,057 B2 * | 8/2004 | Masters et al. ................ 710/55 |
| 2001/0019536 A1 * | 9/2001 | Suzuki ....................... 370/226 |
| 2002/0129312 A1 * | 9/2002 | Sipola ........................ 714/748 |
| 2003/0126309 A1 | 7/2003 | Camble et al. | |
| 2003/0126395 A1 | 7/2003 | Camble et al. | |
| 2003/0187987 A1 | 10/2003 | Messick et al. | |
| 2003/0200247 A1 | 10/2003 | Banzhaf et al. | |
| 2003/0200477 A1 * | 10/2003 | Ayres ............................ 714/2 |
| 2004/0078632 A1 | 4/2004 | Infante et al. | |
| 2005/0081080 A1 * | 4/2005 | Bender et al. ................... 714/2 |
| 2005/0188239 A1 * | 8/2005 | Golasky et al. ................. 714/2 |

* cited by examiner

*Primary Examiner*—Emerson C Puente

(57) ABSTRACT

A method includes receiving a first command for accessing a tape storage system, the first command containing an indicator that the first command was issued as a result of a failover from a first path to the storage system to a second path to the tape storage system. The method further includes determining whether the first command is a repeat of a second command already received by the tape storage system. The first command is processed based on determining whether the first command is a repeat of the second command.

19 Claims, 4 Drawing Sheets

METHOD AND SYSTEM FOR A FAILOVER PROCEDURE WITH A STORAGE SYSTEM

CROSS-REFERENCE TO RELATED APPLICATIONS

This application claims priority under 35 U.S.C. § 119(e) to U.S. Provisional Application Ser. No. 60/587,694, filed Jul. 14, 2004, which is hereby incorporated by reference.

BACKGROUND

Storage area networks are used to store data from multiple host computer systems, such as servers. A storage area network includes a network of storage systems that are capable of storing a relatively large amount of data. Examples of storage systems include tape libraries, disk array systems, and other types systems.

A tape library is basically a storage system that includes multiple tape cartridges or cassettes that are selectively accessed (for reading and writing) in response to access requests from computer systems. If a data path in the storage area network between a host computer system and the tape library fails during a data transfer operation, typically the entire data transfer operation fails. As a result, the failed data transfer operation must be restarted from the beginning, which is a time consuming procedure. To restart the data transfer operation, an operator has to manually configure a second data path through the storage area network from the host computer system to the tape library. The operator then manually restarts the failed data transfer operation using the second path. Also, the operator has to reposition the storage medium (tape cartridge or cassette) to the original starting position.

The manual restarting of a data transfer operation is thus both time consuming and labor intensive. Furthermore, a data transfer operation, such as a tape backup operation, is usually performed during a relatively limited time window each day (such as after work hours). Therefore, if a backup operation fails, then an operator has to wait until the next available period (usually a day later) before the backup operation can be restarted. This delay in performing the backup increases the risk that data may be lost due to equipment failure.

DETAILED DESCRIPTION

Figure 1:
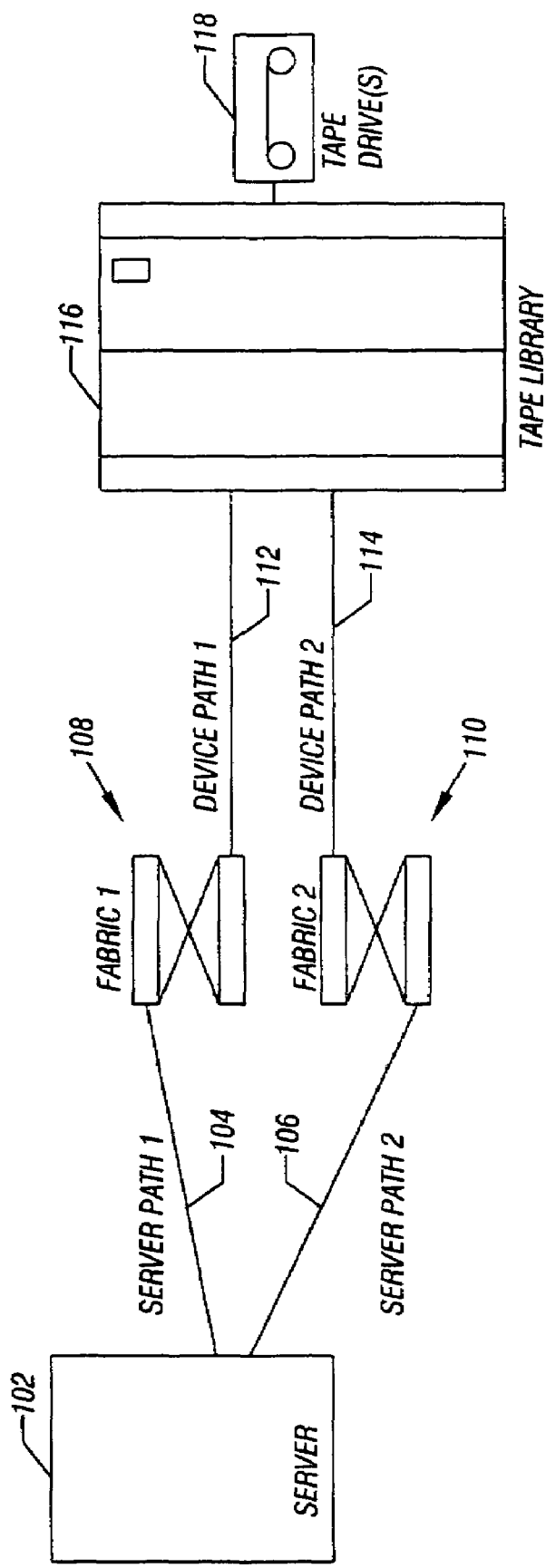
FIG. 1 is a block diagram of an example storage area network that incorporates an embodiment of the invention.

FIG. 1 illustrates a storage area network that includes a host computer system, such as a server 102, coupled to a storage system, such as a tape library 116. Although FIG. 1 illustrates a tape library, other storage systems can be utilized with or instead of the tape library. The tape library 116 has one or plural tape drives 118. The tape library 116 includes multiple tape cartridges or cassettes that are selectively accessed in response to an access command from the server 102. An "access command" is a read command, write command, or any other command to retrieve or update information in storage medium or storage media of the tape library 116.

The tape library 116 includes a tape drive 118 (or multiple tape drives). A picker or robot in the tape library 116 picks a selected one of the tape cartridges or cassettes to transport to the tape drive 118 for performing read and write operations. In other implementations of the storage area network, rather than the tape library 116, another type of tape storage system is used. A "tape storage system" is any storage system that stores data on tape, such as in one or plural tape cartridges or tape cassettes.

Multiple communications paths in the storage area network are present between the server 102 and the tape library 116. For example, a first communications path includes server path 1 (104), fabric 1 (108), and device path 1 (112). A second communications path includes server path 2 (106), fabric 2 (110), and device path 2 (114). Each of the fabrics 108 and 110 includes one or multiple switches for coupling different paths of the storage area network. Although shown as being two separate fabrics, in an alternative embodiment, a single fabric (with one or multiple switches) can be employed. The paths 104, 106, 112, and 114 can include fiber optic links or other forms of communications links. In one example implementation, the fiber optic link can use the Fibre Channel technology. Fibre Channel is a communications link technology governed by standard protocol that operates over a fiber optic or copper cable.

In an alternative embodiment, the communications paths between the server 102 and the tape library 116 can be direct paths without fabrics. Also, although only one server 102 is depicted in FIG. 1, additional servers can be coupled over respective communications paths to the tape library 116. Moreover, other types of storage systems can also be part of the storage area network of FIG. 1, such as disk-based storage systems (e.g., disk array systems).

The server 102 and tape library 116 include control modules, according to some embodiments, for handling failures of communications paths between the server 102 and the tape library 116. The term "control module" refers to either a software module, a hardware module, or a combination of both. Also, the term "control module" can refer to a collection of multiple software and/or hardware components.

The server 102 is able to detect failure of one of the communications paths (e.g., a primary communications path) between the server 102 and tape library 116. In response to detection of the failure of the primary communications path, the server 102 performs a failover procedure to cause access commands that were previously sent over the failed primary communications path to be sent over another communications path (the alternate or failover communications path). In accordance with some embodiments of the invention, the access commands that are sent over the failover communications path as a result of a failover procedure contains a special message or instruction. This instruction, for example, can be a header (such as a flag or other indicator) to indicate that the access commands are associated with a failover operation. In one example implementation, the special header is referred to as a RECOVERY prefix.

In response to receiving an access command that contains the RECOVERY prefix, the tape library 116 checks to determine whether the access command with the RECOVERY prefix is a repeat of a previous command received by the tape library 116. For example, the server 102 may have already sent an access command over the primary communications path prior to failure of the primary communications path. Processing of the command with the RECOVERY prefix is performed based on whether the command is a repeat of a previous command, and based upon a state of processing of the previous command by the tape library 116.

Tape storage systems are accessed using a sequential access technique. A sequence of read and write commands causes a tape storage medium (in tape cartridges or cassettes) to sequentially advance. In other words, each time an access command is submitted to the tape storage system, the tape storage medium is moved by some amount. A subsequent access command starts at a location on the tape storage medium from where the previous access command finished. Because of the sequential nature of tape access, an access command cannot be repeated. For example, submitting the same write command twice to the tape storage system will cause the same data to be written twice onto different locations of the tape storage medium.

A sequential access technique performed with tape storage systems is distinguished from access methods in disk-based storage systems, in which access commands are repeatable. For example, submitting the same write command twice to a disk-based system will cause data written by the write command the first time to be overwritten by the second write command.

Failover processing has to take into account the sequential nature of tape storage systems. Conventionally, if a data transfer operation involving a tape storage system fails due to a failed communications path, a user has to manually restart the data transfer operation from the beginning and manually reposition the tape storage medium to its original position. However, in accordance with some embodiments of the invention, failover processing is made transparent to software applications (such as backup software applications) and users. A failover mechanism (implemented in the server 102 and tape library 116) automatically identifies (in a transparent manner) a failover communications path upon detecting a failed primary communications path. The failover mechanism at the server side then sends commands over the failover communications path. At the tape library side, the failover mechanism is able to check whether commands received over the failover communications path are duplicates of previously received commands. This checking enables the tape library 116 to avoid submitting the same access command more than once to the tape drive(s) 118.

Figure 2:
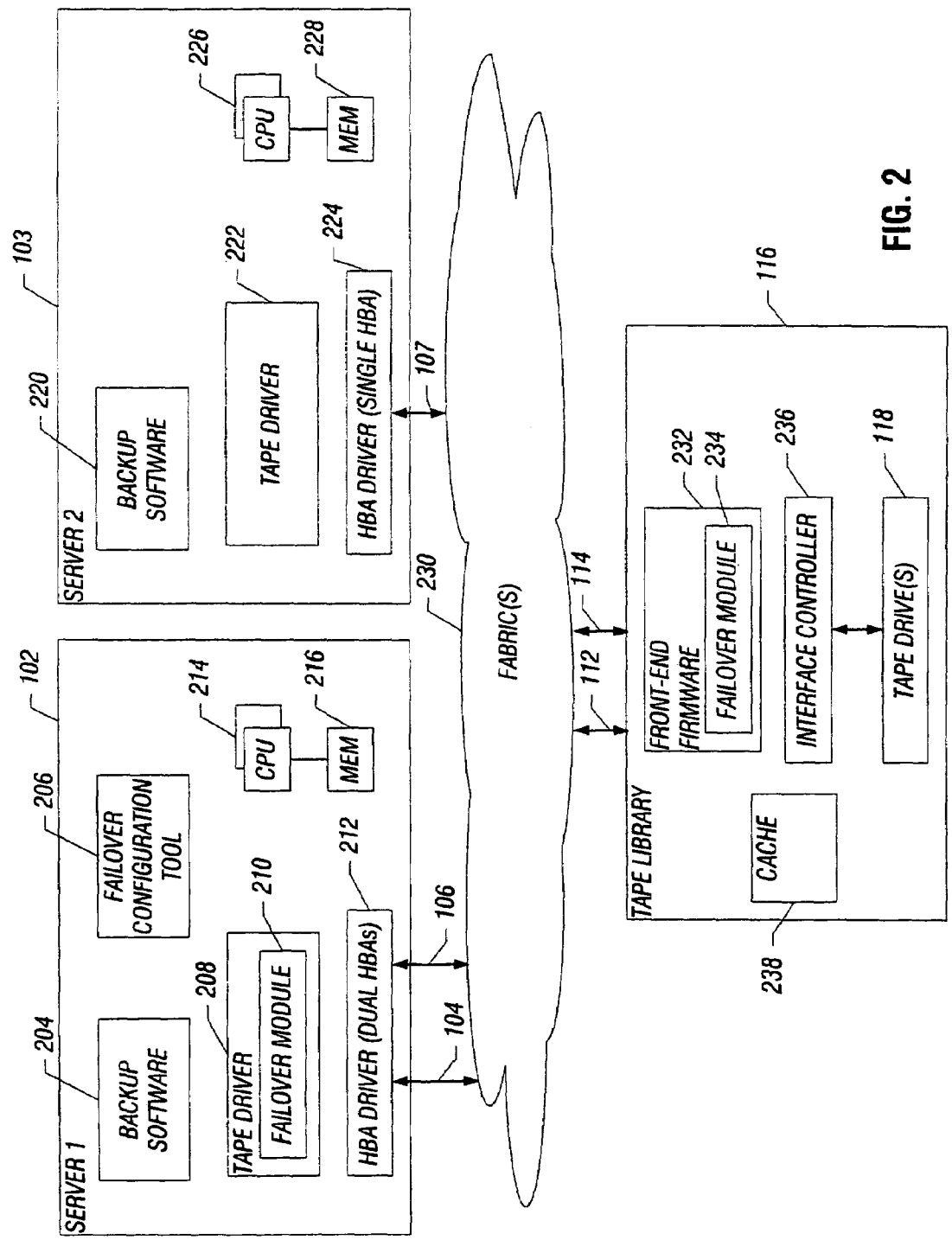
FIG. 2 is a block diagram of servers coupled to a tape library in the storage area network of FIG. 1, in accordance with an embodiment.

FIG. 2 shows components within the server 102 (server 1) and the tape library 116. The components of another server 103 (server 2) are also shown. The server 102 includes backup software 204 for controlling backup operations of data from the server 102 to the tape library 116. The server 102 also includes a failover configuration tool 206 that is accessible by a user to configure characteristics of failover operations. The failover configuration tool 206 enables an operator or administrator to configure the primary and failover communications path between the server 102 and the tape library 116. The operator or administrator of the server 102 can also use the failover configuration tool 206 to determine whether a particular communications path is up (operational) or down (failed). The failover configuration tool 206 can also be used to test the failover procedure described herein.

A tape driver 208 in the server 102 is the device driver that manages access of the tape library 116 over a fabric (or plural fabrics) 230, which in one example includes fabrics 108 and 110 in FIG. 1. The tape driver 208 includes a host failover module 210 for controlling failover procedures in response to detection of a failed communications path.

The server 102 also includes a host bus adapter (HBA) driver 212 that links a host computer system (such as server 102) to communications paths such as those provided by the fabric(s) 230. The HBA driver 212, according to one implementation, is a dual HBA driver that works with two host bus adapters, one for each of the server paths 104 and 106. In one example, each host bus adapter can be a Fibre Channel adapter. The server 102 also includes one or multiple central processing units (CPUs) 214 that are coupled to memory devices 216. The software in the server 102 (such as backup software 204, failover configuration tool 206, tape driver 208, and HBA driver 212) are executable on the CPU(s) 214.

The other server 103, in the example implementation of FIG. 2, does not include failover support. The sever 103 includes backup software 220, a tape driver 222, and an HBA driver 224. However, the server 103 does not include the failover configuration tool 206 or the host failover module 210 of the server 102. The HBA driver 224 of server 103 is a single HBA driver for a single host bus adapter that is coupled to the fabric(s) 230 over the server path 107. The software of the server 103 is executable on one or more CPUs 226, which are coupled to memory devices 228.

The tape library 116 is coupled over device paths 112 and 114 to the fabric(s) 230. The tape library 116 includes front-end firmware 232, which in one example implementation includes a Fibre Channel-to-SCSI bridge (or bridges). The tape library 116 also includes an interface controller 236 to perform library management tasks. Alternatively, the front-end firmware 232 can be part of the interface controller 236. The front-end firmware 232 (or alternatively the interface controller 236) includes a tape library failover module 234 for handling receipt of access commands with a RECOVERY prefix. As used here, a "tape library failover module" refers to a failover module that is executable in a tape storage system (such as the tape library 116). The tape library failover module can be implemented in the front-end firmware and/or the interface controller or as a stand-alone control module.

The tape driver 208 in the server 102 "wraps" commands with a header to indicate that the command is either recoverable or to indicate that a recovery attempt is in progress. The term "wrap" or "wrapping" refers to embedding or encapsulating a command in a message having a header field to indicate a type of the command. The header field can include either a RECOVERABLE prefix or a RECOVERY prefix. A command that is a non-repeatable tape drive command is prefixed with the RECOVERABLE prefix. A non-repeatable command is an access command that cannot be repeated. Examples of non-repeatable commands include read and write commands, among others. For example, in a write operation, data is sequentially written onto tape of the tape drive. If the write is repeated, then the write would start at a different position on the tape; therefore, the write is not repeated to the same position on tape. This non-repeatable characteristic is also true of a read command. A first read command issued to a tape drive causes data to be read from a first position of the tape. A subsequent identical read command would cause data to be retrieved from a different position on tape, since the tape storage medium has already moved by a certain amount in response to the first read command. The interface controller 236 processes commands with the RECOVERABLE prefix differently than commands without the RECOVERABLE prefix.

For example, in response to receiving a write command with the RECOVERABLE prefix, the interface controller 236 waits until all write data has been received and cached (in a cache 238) before the write command is issued to the tape drive(s) 118. Waiting until all write data has been received and cached before proceeding with the write ensures that the write can be properly completed in a failover procedure.

For a non-repeatable read command, the response data is stored in the cache 238 so that the response data for the read command can be retrieved over a failover communications path after failure of an original communications path over which the read command was received. Storing the response data in the cache 238 enables the response data to be retrieved without having to repeat the read command (which would have involved a time-consuming repositioning of the tape storage medium). The responses for other non-repeatable commands are similarly cached in the cache 238 for later retrieval should path failure occur.

Figure 3:
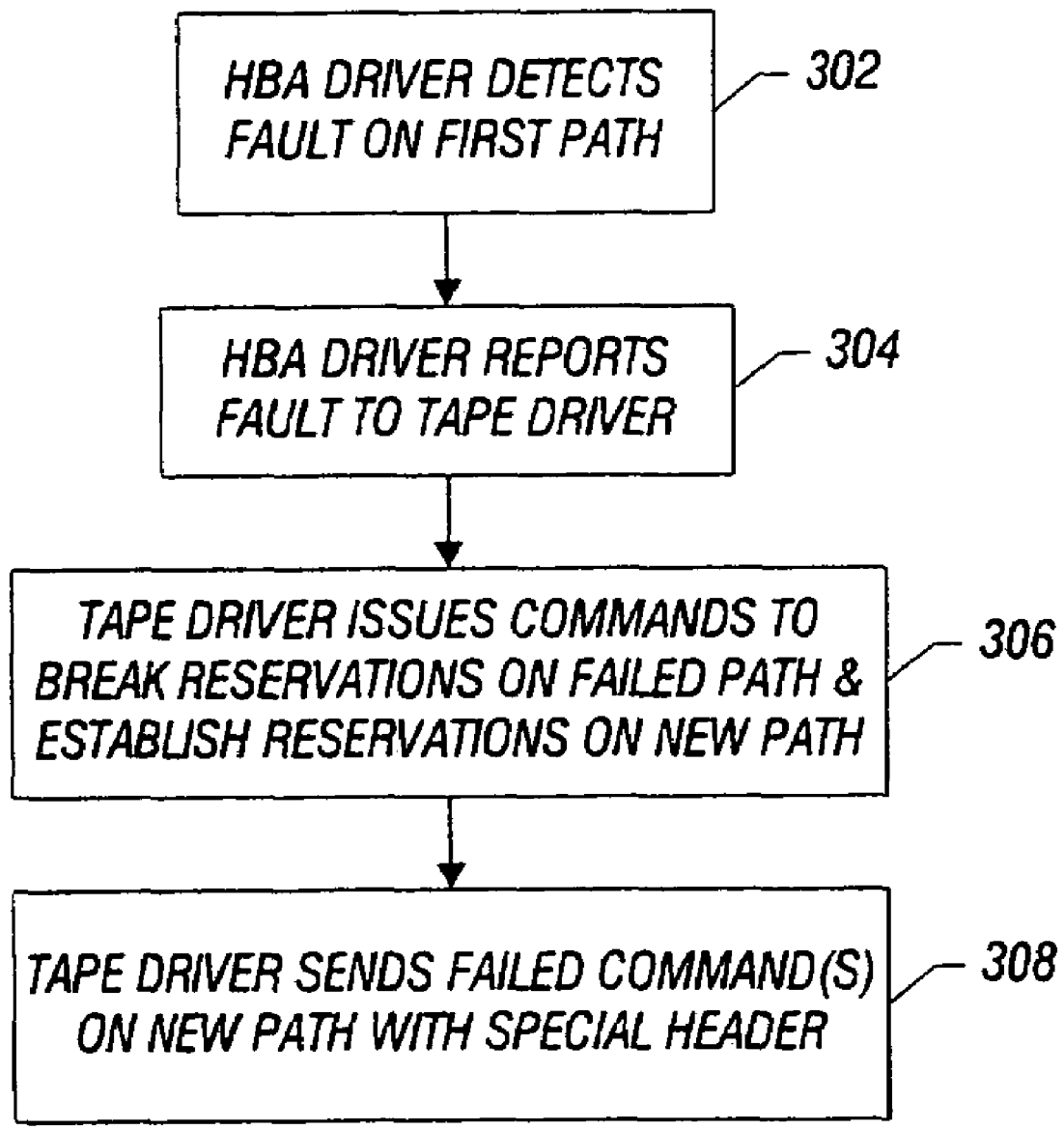
FIG. 3 is a flow diagram of a process of detecting a fault on a first path in the storage area network and performing failover to a second path, in accordance with an embodiment.

FIG. 3 shows a process performed in the server 102, according to one embodiment. The HBA driver (212) detects (at 302) a fault on a first communications path (such as the path including server path 1, fabric 1, and device path 1 shown in FIG. 1). In response to detecting the fault in the first communications path, the HBA driver 212 reports (at 304) the fault to the host failover module 210 in the tape driver 208 (FIG. 2). The host failover module 210 then causes the tape driver 208 to issue (at 306) commands to break reservations on the failed communications path and to establish reservations on a new communications path. Establishing reservations on a communications path refers to obtaining resources on the communications path such that communications can be achieved on the path. The host failover module 210 next causes the tape driver 208 to send (at 308) failed command(s) on the new communications path with a message or instruction, such as a special header, in this case the RECOVERY prefix. Note that the tape driver may have already sent some of the failed command(s) over the original communications path before failure of the original communications path.

Figure 4:
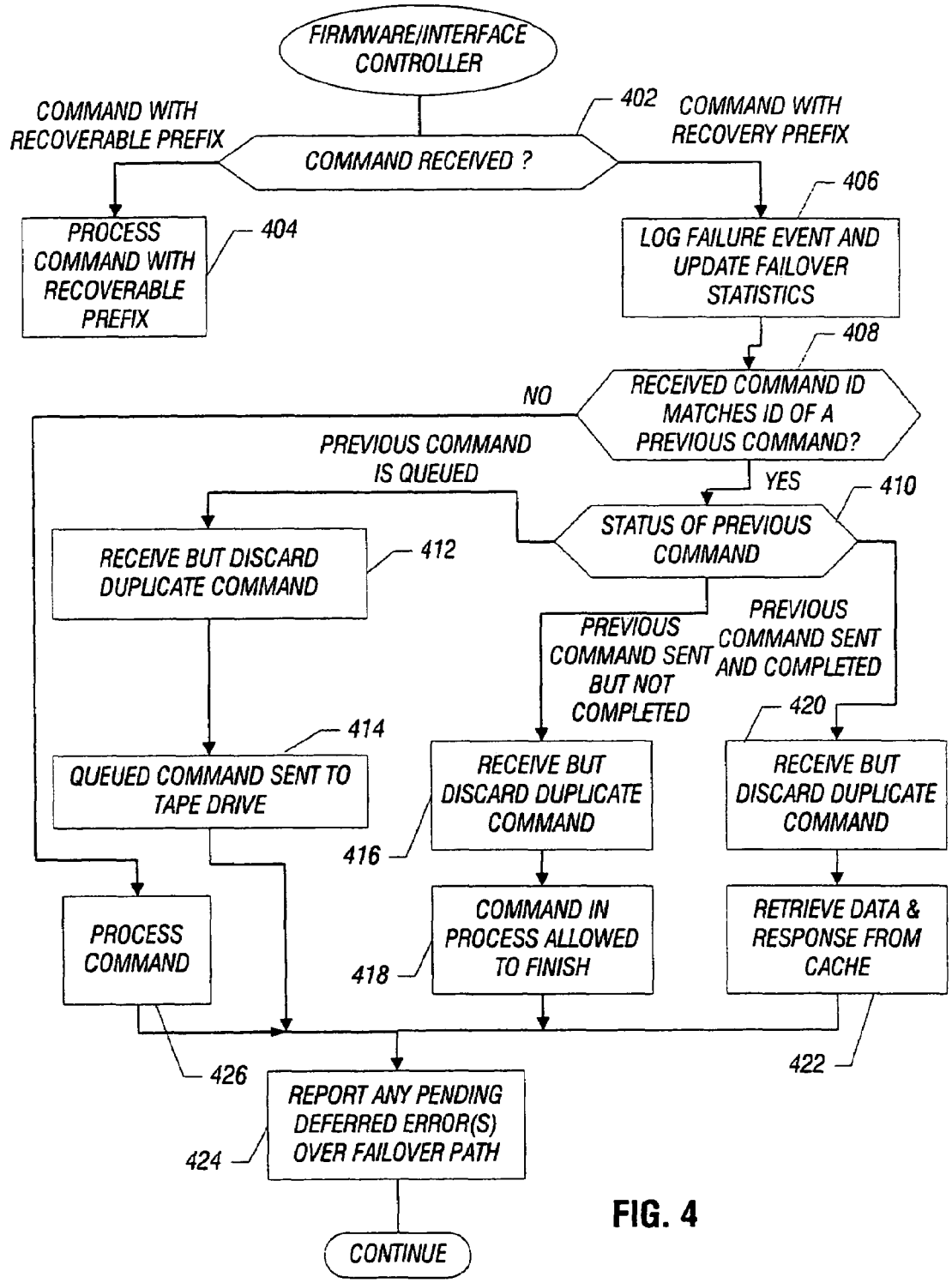
FIG. 4 is a flow diagram of a process performed by a controller associated with the tape library in response to access commands sent from a server, in accordance with an embodiment.

FIG. 4 shows a process performed by the firmware 232 and/or interface controller 236 (FIG. 2) in response to a received command (at 402). If the received command has a RECOVERABLE prefix, processing (at 404) of the command with the RECOVERABLE prefix is performed. For example, a write command with a RECOVERABLE prefix is not submitted to the tape drive 118 (FIG. 2) until all write data is received and cached.

The response and any data for other types of non-repeatable commands (such as a read command, load/unload command, and so forth) are stored in the cache 238 (FIG. 2). As noted above, if failover occurs, the response and any data are retrieved from the cache 238 so that a repeat of a later submitted duplicate command over the failover communications path does not have to be performed (to avoid having to reposition the tape storage medium).

If the received command (402) has a RECOVERY prefix, then the tape library failover module 234 (FIG. 2) in the firmware/interface controller logs (at 406) the failure event and updates failover statistics. Note that a command with a RECOVERY prefix is received over a failover communications path. The received command has a command identifier (referred to as a "command ID"). The tape library failover module 234 determines (at 408) whether the received command ID matches the command ID of a previous command (a command that was previously received). As noted above, prior to failure of a communications path, the server 102 may have already sent a command that is received at the firmware/interface controller. However, before the results for the command are returned to the server 102, failure of the communications path occurred. If the received command ID does not match an ID of a previous command (as determined at 408), then the tape library failover module 236 causes the interface controller 236 to process (at 426) the command received over the failover communications path.

However, if the command ID of the received command matches the command ID of a previous command, then the tape library failover module 234 determines (at 410) the status of the previous command. If the previous command is queued, but not yet sent to the tape drive(s) 118 (FIG. 2) for processing, the duplicate command is received but discarded (at 412) by the interface controller 236. The queued previous command is then sent (at 414) by the interface controller 236 to the tape drive(s) 118 (FIG. 2) for processing.

If the tape library failover module 234 determines (at 410) that the previous command has been sent to the tape drive(s) 118 but has not yet completed, the interface controller 236 receives but discards the duplicate command (at 416). The previous command in progress is then allowed to finish (at 418).

If the tape library failover module 234 determines (at 410) that the previous command has been sent to the tape drive and the operation has completed, the interface controller receives but discards the duplicate command (at 420). The data and response are then retrieved (at 422) by the interface controller 236 from cache in the tape library 116 (FIG. 2).

Following processing of either the currently received command or the previous command, the result of the operation in response to the access command is reported back to the server 102 from the tape library 116. Also, any pending deferred errors are reported (at 424) over the failover communications path back to the server 102. The ability to report pending deferred errors allows the tape library 116 (FIG. 2) to store errors that cannot be sent over the failed communications path until a new path (the failover communications path) has been established.

By employing the failover mechanism according to some embodiments, failover operation from a failed communications path to a failover communications path between a host computer system and a tape storage system can be achieved without having to restart a data transfer operation previously submitted to the tape storage system but not yet completed. The failover procedure can also be performed without having to reposition tape storage media. Moreover, the failover procedure, which is transparent both to backup software applications and users, can be performed without manual user intervention, which enhances reliability and reduces involvement of personnel. For example, during a backup operation of data on a server to a tape storage system (which usually occurs after work hours), a failed communications path can be automatically detected by the failover mechanism according to some embodiments. The failover mechanism then identifies a failover communications path and re-submits all uncompleted commands. A failover module in the tape storage system checks the re-submitted commands to ensure that duplicate commands are not submitted to the tape storage device.

Instructions of the various software routines or modules discussed herein (such as the host failover module 210 (FIG. 2), tape library failover module 234, and other software components) are executed on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules), in the form of computer program code, are stored on one or more machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A tape storage system, comprising:
   a tape storage medium;
   a tape drive to access the tape storage medium; and
   a controller to:
      detect that a failover procedure from a failed path to a second path is occurring;
      receive a first command over the second path, wherein the first command is to access content of the tape storage medium, and wherein the first command is a duplicate of a previously received second command; and
      process the first command in the failover procedure without having to reposition the tape storage medium.

2. The tape storage system of claim 1, wherein the first command is a duplicate of the previously received second command sent over the failed path.

3. The tape storage system of claim 1, further comprising an interface to a storage area network, the failed path and second path being part of the storage area network.

4. The tape storage system of claim 1, wherein the controller is adapted to detect that the failover procedure is occurring based on receiving the first command containing a first predetermined indicator, the first predetermined indicator indicating that the failover procedure is occurring.

5. The tape storage system of claim 4, wherein the second command contains a second predetermined indicator, the second predetermined indicator indicating that the second command is a non-repeatable command.

6. The tape storage system of claim 5, wherein the second command is a write command, and wherein the controller is adapted to wait for all data for the second command to be received before submission of the second command to the tape drive.

7. The tape storage system of claim 5, wherein the controller processing the first command includes the controller discarding the first command and allowing the second command to be processed by the tape drive.

8. A tape storage system, comprising:
   a tape storage medium;
   a tape drive to access the tape storage medium;
   a cache to store responses and data; and
   a controller to:
      detect that a failover procedure from a failed path to a second path is occurring;
      receive a first command over the second path, wherein the first command is a duplicate of a previously received second command, wherein the controller is adapted to detect that the failover procedure is occurring based on receiving the first command containing a first predetermined indicator, the first predetermined indicator indicating that the failover procedure is occurring, wherein the second command contains a second predetermined indicator, the second predetermined indicator indicating that the second command is a non-repeatable command;
      discard the first command;
      process the second command without having to reposition the tape storage medium, wherein processing the second command includes:
         if the second command is queued, sending the queued second command to the tape drive;
         if the second command has been sent to the tape drive but has not yet completed, allowing the tape drive to complete processing; and
         if the second command has completed, retrieving a response and any data for the completed second command from the cache.

9. A method of processing a command to access a tape storage system, comprising:
   receiving a first command for accessing the tape storage system, the first command containing an indicator that the first command was issued as a result of a failover from a first path to the tape storage system to a second path to the tape storage system;
   determining whether the first command is a repeat of a second command already received by the tape storage system;
   discarding the first command in response to determining that the first command is a repeat of the second command; and
   submitting the second command to a tape drive of the tape storage system in response to determining that the second command has been queued but has not yet been sent to the tape drive.

10. The method of claim 9, further comprising allowing the second command to be completed by the tape drive in response to determining that the second command has been sent to the tape drive but has not yet completed.

11. The method of claim 10, further comprising retrieving a response and any data from a cache in response to determining that the second command sent to the tape drive has completed.

12. The method of claim 9, further comprising receiving the second command, the second command having a second indicator to indicate that the second command is non-repeatable.

13. The method of claim 12, wherein the second command is a write command, the method further comprising waiting to submit the second command to a tape drive of the tape storage system until all write data for the second command has been received and cached.

14. Computer program code stored on at least one storage medium, the computer program code containing instructions that when executed cause a central processing unit (CPU) to:
   detect that a first path to a tape storage system has failed;
   in response to detecting that the first path has failed, send a first command over a second path to the tape storage system; and
   add a first indicator to the first command, the first indicator to indicate to the tape storage system that the first command has been sent due to failover from the first path to the second path,
   wherein the first command enables the tape storage system to perform a failover procedure without repositioning tape storage medium in the tape storage system.

15. The computer program code of claim 14, wherein the instructions when executed cause the CPU to:
   send a second command over the first path to the tape storage system prior to failure of the first path; and
   add a second indicator to the second command, the second indicator to indicate to the tape storage system that the second command is non-repeatable.

16. An article comprising at least one storage medium containing instructions that when executed cause a central processing unit (CPU) to:
   receive a first command to access a tape storage system;
   receive a second command containing a first indicator to indicate that failover from a first path to a second path has occurred as part of a failover procedure, wherein the second command is a duplicate of the first command;
   process the second command in the failover procedure without having to reposition a tape storage medium in the tape storage system.

17. The article of claim 16, wherein receiving the first command comprises receiving the first command containing a second indicator, the second indicator indicating that the first command is a non-repeatable command.

18. The article of claim 17, wherein processing the second command includes discarding the second command and allowing the first command to be processed by the tape storage system.

19. A method of performing failover from a first path to a second path between a host and a tape storage system, comprising:
   sending a first command over the first path to the tape storage system;
   prior to completion of the first command, detecting that the first path has failed;
   in response to detecting that the first path has failed, initiating a failover procedure, without user intervention, to identify the second path;
   re-submitting the first command over the second path to the tape storage system, wherein the re-submitted first command contains an indicator to indicate that the re-submitted first command is associated with the failover procedure; and
   processing, in the tape storage system, the re-submitted first command without re-positioning tape storage medium in the tape storage system.

* * * * *